UNITED STATES PATENT OFFICE.

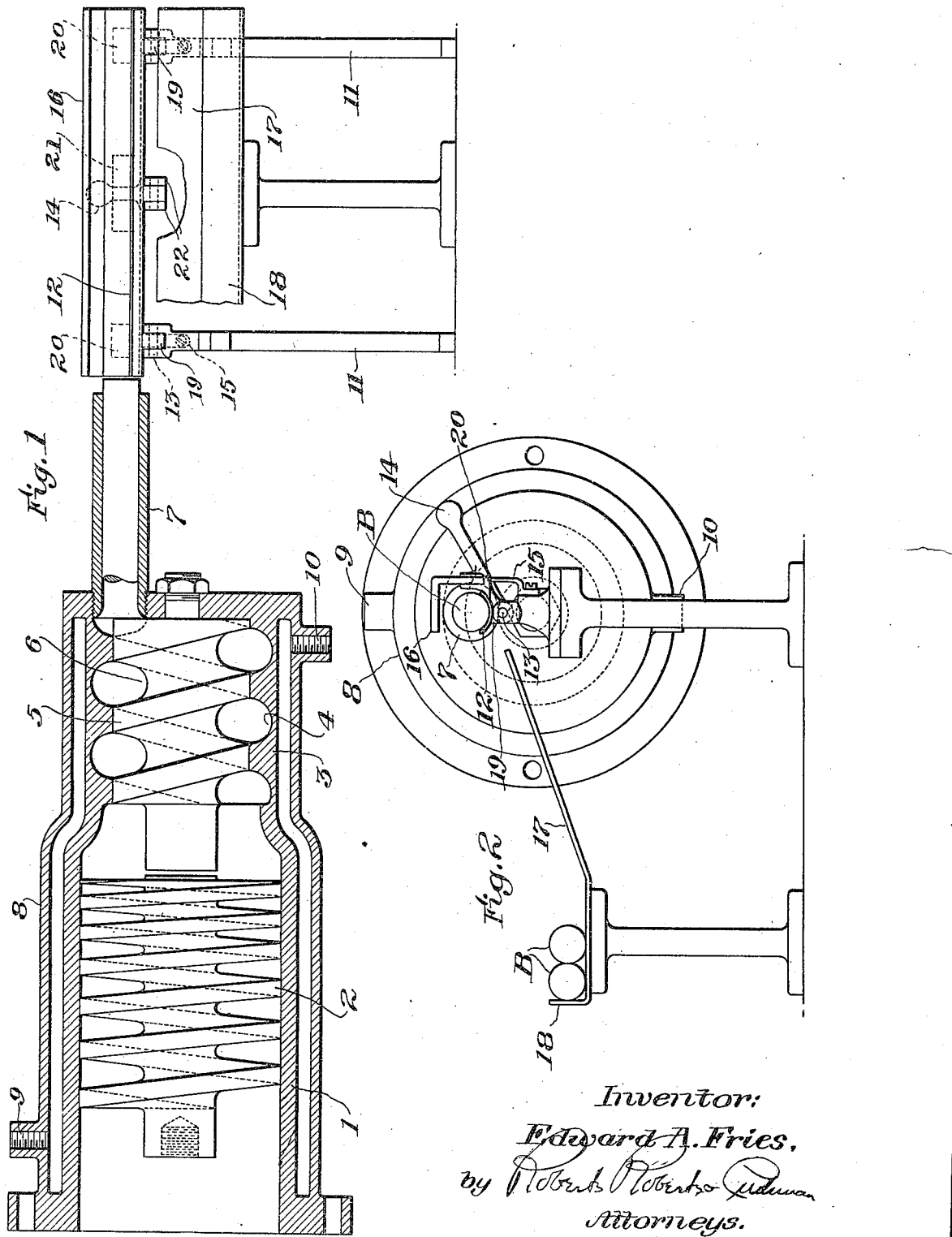

EDWARD A. FRIES, OF BOSTON, MASSACHUSETTS, ASSIGNOR TO RANDALL & FRIES, A COPARTNERSHIP CONSISTING OF LILLIAN L. RANDALL AND SAID EDWARD A. FRIES, BOTH OF BOSTON, MASSACHUSETTS.

APPARATUS FOR FORMING PLASTIC BARS.

1,293,398.  Specification of Letters Patent.  Patented Feb. 4, 1919.

Application filed November 21, 1916. Serial No. 132,694.

*To all whom it may concern:*

Be it known that I, EDWARD A. FRIES, a citizen of the United States, and resident of Boston, in the county of Suffolk and State of Massachusetts, have invented new and useful Improvements in Apparatus for Forming Plastic Bars, of which the following is a specification.

This invention relates to machines for forming bars or rods of plastic material; and although capable of more general application the invention is particularly designed for forming bars of clay while in soft and plastic condition, suitable for turning into spark plug bodies, plumbing fittings and other articles turned from plastic clay and then baked to form porcelain.

In the accompanying drawings which illustrate the invention,—

Figure 1 is a longitudinal, vertical section, partly in elevation, of a bar-forming machine embodying the invention; and Fig. 2 is an end elevation of the machine, viewed from the right of Fig. 1.

1 represents a horizontally disposed cylinder, within which is a rotary screw conveyer 2. The pitch of the screw of the conveyer 2 decreases progressively from its intake end toward its delivery end, for the purpose hereinafter explained.

At the delivery end of the cylinder is the somewhat contracted portion 3, in the inner walls of which is a helical channel 4. A core 5, closely fitting and securely fixed within the part 3, is made with a helical channel 6, corresponding to the channel 4, and forming therewith a helical passage of substantially smaller cross section than the cylinder 1, leading from the delivery end of the cylinder.

A forming tube 7, secured to the head of the part 3, leads from the delivery end of the helical passage. As a good deal of heat is developed by the friction of the plastic clay being forced through the cylinder and helical passage it is advisable to cool the parts by a water jacket 8, in which cooling water may be circulated through inlet and outlet ports 9 and 10.

A receiving trough 12 is supported on standards 11 in substantial alinement with the forming tube 7 and in close proximity to the delivery end of the tube. The receiver 12 is preferably in the form of a segment of a cylinder—about a third of a complete cylinder being a good proportion—and is preferably formed on a radius slightly greater than that of the tube 7, so that the plastic bar delivered by the tube 7 on to the trough 12 will not be marred by coming into contact with the edges of the trough. The trough 12 is attached to or integral with lugs 19 having extensions 20 and holes for mounting on pivots 13, 13, at the top of the supports 11, so that it may be tilted or rocked on an axis parallel to its own longitudinal axis, to discharge the clay bar. A handle 14 having a lateral extension 21 is fixed to lugs 22 on the trough to rock the latter, and fixed stops 15 adjustably mounted on the standards 11 engage the extensions 20 of the lugs 19 to arrest and hold the trough in normal, level position to receive the plastic bar. A straight ledge 16 is spaced above the trough and secured thereto, as by attachment to extensions 20 and 21, so as to swing therewith as a single part.

At one side of the trough and a little below it is an inclined tray 17 upon which the plastic bar is deposited when discharged from the trough. A flange 18 at the lower outer edge of the tray serves as a stop to prevent the bars B from rolling off the tray.

The operation of the device is as follows: A mass of plastic clay or similar material is introduced into the chamber within cylinder 1, and is forced forward into the helical passage by the rotating screw conveyer 2. The conveyer mixes and works the material, and as the pitch of the screw diminishes toward the delivery end the material will be compressed and compacted as it is pressed forward. From the chamber 1 the material is forced through the helical passage, in which a further working, kneading, and compacting of the material takes place, expelling any air bubbles that might be in the mass and delivering the same in smooth, homogeneous and uniform consistency into the forming tube 7. In the forming tube the plastic bar (Fig. 1) is straightened out and given its final form, and is thence pushed forward across the short intervening space on to the receiving trough 12. When the desired length of plastic bar has been laid upon the receiving trough, the conveyer screw 2 is stopped and the bar cut off between the ends of the tube 7 and the trough 12 by means of a wire or other suitable cutter. The cut plastic bar B (Fig. 2) is then discharged from the trough by rocking or tilting the trough with the handle 14, until the lower edge of the trough comes opposite the upper edge of the tray 17. In this position the bar B will roll off the trough on to the tray. The straight ledge 16, which is swung down in front of the bar when the trough is tilted, engages and arrests the bar when the latter is first deposited on the tray, preventing the soft bar from bending, or straightening it out if bent upon being rolled off the trough, and insuring that it shall be started down the incline in a true transverse line free from obliquity. The trough is then swung back to its normal position, which lifts the ledge 16 out of the path of the bar, and the bar rolls down the inclined tray and is stopped against the straight flange 18, or against the bar B ahead of it, as the case may be.

I claim:

1. In combination, a forming tube, means to force plastic material through said tube, and an oscillatory receiver in substantial alinement with said tube and in proximity to the delivery end of the tube.

2. In combination, a forming tube, means to force plastic material through said tube, a receiving trough in substantial alinement with said tube and in proximity to the delivery end of the tube, and means pivotally supporting the receiving trough to swing transversely of said tube.

3. In combination, a forming tube, means to force plastic material through said tube, and a receiving trough in substantial alinement with said tube and in proximity to the delivery end of the tube, said trough being mounted to rock to discharge a bar supported therein.

4. In combination, a forming tube, means to force plastic material through said tube, a receiving trough in substantial alinement with said tube and in proximity to the delivery end of the tube, said trough being mounted to rock to discharge a bar supported therein, and a tray positioned to receive the bar so discharged from the trough.

5. In combination, a forming tube, means to force plastic material through said tube, a receiving trough in substantial alinement with said tube and in proximity to the delivery end of the tube, said trough being mounted to rock to discharge a bar supported therein, and an inclined tray positioned to receive the bar so discharged from the trough.

6. In combination, a forming tube, means to force plastic material through said tube, a receiving trough in substantial alinement with the tube and in proximity to the delivery end of the tube, said trough being mounted to rock to discharge a plastic bar supported therein, and a straight ledge parallel to and spaced from the trough adapted to engage a bar discharged from the trough.

7. In combination, a forming tube, means to force plastic material through said tube, a receiving trough in substantial alinement with the tube and in proximity to the delivery end of the tube, said trough being mounted to rock to discharge a plastic bar supported therein, and a straight ledge secured to and spaced above the trough and swinging therewith as a single part, adapted to engage a bar discharged from the trough.

8. In combination, a forming tube, means to force plastic material through said tube, a receiving trough in substantial alinement with the tube and in proximity to the delivery end of the tube, said trough being mounted to rock to discharge a plastic bar supported therein, an inclined tray positioned to receive the bar so discharged from the trough, and a straight ledge secured to and spaced above the trough and swinging therewith as a single part, adapted to engage and arrest a bar when deposited from the trough upon the tray, and to permit the bar to pass down the tray when the trough is in normal position.

9. A machine for forming bars of plastic material comprising a chamber, a tortuous passage leading from said chamber, a forming tube leading from said tortuous passage, and means to force the material through said chamber, passage and tube.

10. A machine for forming bars of plastic material comprising a chamber, a helical passage leading from said chamber, a forming tube leading from said helical passage, and means to force the material through said chamber, passage and tube.

11. A machine for forming bars of plastic material comprising a chamber, a helical passage of relatively small cross sectional area leading from said chamber, a forming tube leading from said helical passage, and means to force the material through said chamber, passage and tube.

12. A machine for forming bars of plastic material comprising a cylinder, a helical passage of relatively small cross sectional area leading from said cylinder, a forming tube leading from said passage, and a screw conveyer in said cylinder adapted to force the material through said cylinder, passage and tube.

13. A machine for forming bars of plastic material comprising a cylinder, a helical passage of relatively small cross sectional area leading from said cylinder, a forming tube leading from said passage, and a screw conveyer in said cylinder adapted to force the material through said cylinder, passage and tube, the delivery end of the screw conveyer being of lower pitch than the intake end.

14. A machine for forming bars of plastic material comprising a cylinder, a helical passage of relatively small cross sectional area leading from said cylinder, a forming tube leading from said passage, and a screw conveyer in said cylinder adapted to force the material through said cylinder, passage and tube, the screw conveyer having a progressively decreasing pitch from its intake end toward its delivery end.

15. A machine for forming bars of plastic material comprising a cylinder, a helical passage of relatively small cross sectional area leading from said cylinder, a forming tube leading from said passage, a screw conveyer in said cylinder adapted to force the material through said cylinder, passage and tube, and a receiving trough in substantial alinement with said forming tube and in proximity to the delivery end thereof.

Signed by me at Boston, Massachusetts, this 11th day of November 1916.

EDWARD A. FRIES.

Copies of this patent may be obtained for five cents each, by addressing the "Commissioner of Patents, Washington, D. C."